United States Patent
Gupta et al.

(10) Patent No.: US 9,672,314 B2
(45) Date of Patent: *Jun. 6, 2017

(54) LOGIC STRUCTURE AWARE CIRCUIT ROUTING

(71) Applicant: International Business Machines Corporation, Armonk, NY (US)

(72) Inventors: Saurabh Gupta, Meerut (IN); Srujan Nadella, Guntur (IN); Padmashri Ramalingam, Bangalore (IN); Sourav Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,455

(22) Filed: Dec. 8, 2016

(65) Prior Publication Data

US 2017/0083657 A1   Mar. 23, 2017

Related U.S. Application Data

(63) Continuation of application No. 15/095,390, filed on Apr. 11, 2016, which is a continuation of application No. 14/821,846, filed on Aug. 10, 2015.

(51) Int. Cl.
*G06F 17/50*   (2006.01)

(52) U.S. Cl.
CPC ...... *G06F 17/5077* (2013.01); *G06F 17/5054* (2013.01); *G06F 17/5081* (2013.01); *G06F 2217/08* (2013.01)

(58) Field of Classification Search
None
See application file for complete search history.

(56) References Cited

U.S. PATENT DOCUMENTS

| | | | |
|---|---|---|---|
| 5,963,454 A | 10/1999 | Dockser et al. | |
| 6,026,226 A | 2/2000 | Heile et al. | |
| 6,295,636 B1 | 9/2001 | Dupenloup | |
| 6,425,116 B1 | 7/2002 | Duboc et al. | |
| 7,003,749 B2 * | 2/2006 | Subasic | G06F 17/5072 716/122 |
| 7,007,261 B1 | 2/2006 | Ballagh et al. | |
| 7,895,557 B2 | 2/2011 | Alpert et al. | |
| 8,185,850 B1 | 5/2012 | Schumacher | |
| 8,271,920 B2 | 9/2012 | Cho et al. | |
| 8,490,042 B2 | 7/2013 | Gao | |

(Continued)

OTHER PUBLICATIONS

Chou et al., "Structure-Aware Placement for Datapath-Intensive Circuit Designs", DAC 2012, Jun. 3-7, 2012, San Francisco, California, USA. Copyright 2012 ACM 978-1-4503-1199—Jan. 12, 2006, pp. 762-767.

(Continued)

*Primary Examiner* — Leigh Garbowski
(74) *Attorney, Agent, or Firm* — Steven F. McDaniel

(57) ABSTRACT

A method, executed by a computer, for routing a circuit includes receiving a logic structure for a circuit, retrieving a logic template, determining whether the logic structure for the circuit matches the logic template, and routing the circuit using a routing recipe corresponding to the logic template in response to determining that the logic structure matches the logic template. A corresponding computer program product and computer system are also disclosed herein.

1 Claim, 6 Drawing Sheets

(56) References Cited

U.S. PATENT DOCUMENTS

| | | |
|---|---|---|
| 8,745,565 B2 | 6/2014 | Gao |
| 8,751,996 B1 | 6/2014 | Birch et al. |
| 9,177,093 B2 * | 11/2015 | He .................... G06F 17/5077 |
| 2006/0230377 A1 * | 10/2006 | Rapp ........................ G06F 9/54 716/102 |
| 2008/0288909 A1 | 11/2008 | Leijten-Nowak |
| 2009/0228854 A1 * | 9/2009 | Sakamoto ........... G06F 17/5068 716/122 |
| 2014/0215426 A1 | 7/2014 | He et al. |

OTHER PUBLICATIONS

Clarke et al., "Eliminating Routing Congestion Issues with Logic Synthesis", pp. 1-7, cadence, ©2011 Cadence Design Systems, Inc., <www.cadence.com>.

Gupta et al., "Logic Structure Aware Circuit Routing", U.S. Appl. No. 14/821,846, filed Aug. 10, 2015, 27 pages.

Gupta et al., "Logic Structure Aware Circuit Routing", U.S. Appl. No. 15/095,390, filed Apr. 11, 2016, 24 pages.

Gupta et al., "Logic Structure Aware Circuit Routing", U.S. Appl. No. 15/372,438, filed Dec. 8, 2016, 24 pages.

IBM Appendix P, list of patents and patent applications treated as related, Dec. 8, 2016, 2 pages.

* cited by examiner

200

216 Topology Formula 220A      210A   212  214

Low power: Entity1(n) = Cell1(1.5*n) + Cell2(2*n) + Cell5(2*n) + Cell6(1*n)

High throughput: Entity1(n) = Cell1(2*n) + Cell2(3*n) + Cell3(1.5*n) + Cell4(0.5*n)

220B  216  212  214  210B

Wiring Formula

InputStage3(p) =   if(p&1)    OutputStage2(p/2)
                        else        OutputStage2(N+p/2);

where p is the pth input.

Scenario Dependent Routing Recipe(s)

Wiring_Constraints_Entity1_LowPower =
[
  Define_Netgroup{Netgroup1,Netgroup2,Netgroup3,NetgroupN}
260A →   Define_constraints_Netgroup1{Metal_Stack_Range, Width_Code, Spacing_Code}
  Define_constraints_Netgroup2{Metal_Stack_Range, Width_Code, Spacing_Code}
  ..so on....
]
                                       262    264    266

Wiring_Constraints_Entity1_HighThroughput =
[
  Define_Netgroup{Netgroup1',Netgroup2',Netgroup3',NetgroupN'}
260B →   Define_constraints_Netgroup1'{Metal_Stack_Range, Width_Code, Spacing_Code}
  Define_constraints_Netgroup2'{Metal_Stack_Range, Width_Code, Spacing_Code}
  ..so on....
]
                                       262    264    266

FIG. 2B

LOGIC STRUCTURE AWARE CIRCUIT ROUTING

BACKGROUND OF THE INVENTION

The present invention relates generally to designing electronic circuits such as integrated circuits, and more particularly to routing signal paths for electronic circuits.

Modern integrated circuits often have millions of circuit elements such as gates, latches, and drivers in addition to scores of I/O pins. Each of these circuit elements must be electrically connected to other circuit elements, or to I/O pins, via wires (a.k.a. traces) to realize desired functionality. The process of determining the connection path for the circuit wires is referred to as routing.

SUMMARY

A method, executed by a computer, for routing a circuit includes receiving a logic structure for a circuit, retrieving a logic template, determining whether the logic structure for the circuit matches the logic template, and routing the circuit using a routing recipe corresponding to the logic template in response to determining that the logic structure matches the logic template. A corresponding computer program product and computer system are also disclosed herein.

BRIEF DESCRIPTION OF THE DRAWINGS

FIG. 2A is a text diagram depicting one example of a logic template in accordance with at least one embodiment of the present invention;

FIG. 2B is a text diagram depicting one example of a routing recipe in accordance with at least one embodiment of the present invention;

DETAILED DESCRIPTION

The embodiments disclosed herein improve the routing of circuits such as integrated circuits.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
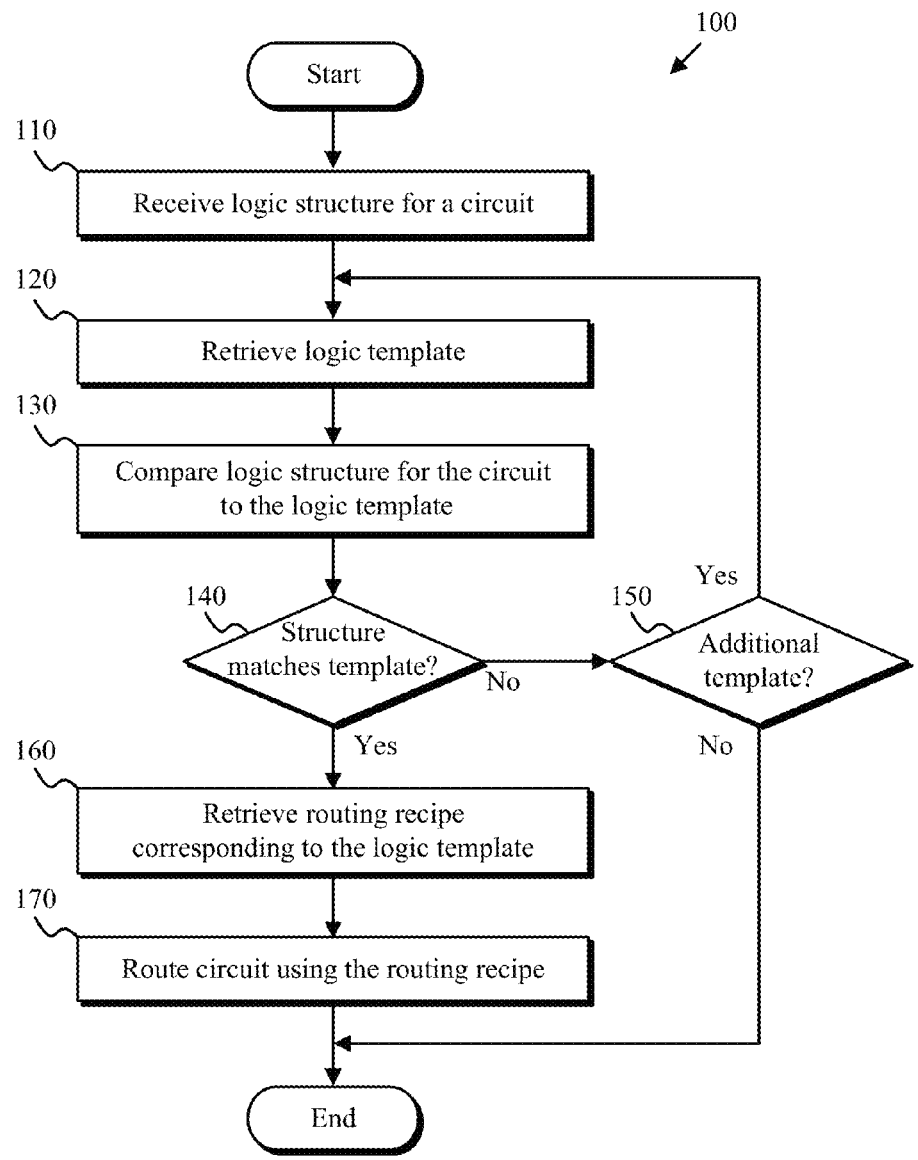
FIG. 1 is flowchart depicting a circuit routing method in accordance with at least one embodiment of the present invention.

The present invention will now be described in detail with reference to the Figures. FIG. 1 is flowchart depicting a circuit routing method 100 in accordance with at least one embodiment of the present invention. As depicted, the circuit routing method 100 includes receiving (110) a logic structure for a circuit, retrieving (120) a logic template, comparing (130) the logic structure to the logic template, determining (140) whether the logic structure matches the logic template, determining (150) whether additional templates are available, retrieving (160) a routing recipe, and routing (170) the circuit using the routing recipe. The circuit routing method 100 enables logic structure aware routing of a circuit.

Receiving (110) a logic structure for a circuit may include receiving a logic network that has been synthesized from a high level specification for the circuit such as a set of VHDL hardware description statements. Retrieving (120) a logic template may include retrieving a logic template from a library or database of logic templates for which routing recipes are available. In some embodiments, pre-tabulated routing recipes which are referenced by the logic templates are also stored in the library or database.

Comparing (130) the logic structure to the logic template may include matching function names, parameters, and the like, within the logic structure and the logic template. Determining (140) whether the logic structure matches the logic template may include evaluating the results from the comparison operation 130. If the logic structure does not match the logic template, the method proceeds by determining (150) whether additional templates are available.

Determining (150) whether additional templates are available may include decrementing a counter corresponding to the available templates in a library or database. If additional templates are available, the method loops to the retrieving operation 120. If no additional templates are available, the method may terminate and routing of the circuit (along with any required placement) may be conducted by traditional approaches.

Returning to the determining operation 140, if the logic structure matches the logic template the method proceeds by retrieving (160) a routing recipe. Retrieving (160) a routing recipe may include retrieving a routing recipe corresponding to the matched logic template. The routing recipe may correspond to specific design objectives such as reduced latency or high circuit density. In some embodiments, the routing recipe is stored with the corresponding template in a library or database.

Routing (170) the circuit using the routing recipe may include conforming to routing parameters specified in the routing recipe. Placement of the circuit may also occur in conjunction with routing (170) the circuit or placement may have occurred previous to execution of the depicted method. In some embodiments, placement of the circuit is specified by, or influenced by, placement information include in the logic template. On completion of an initial routing (and any required placement), the timing of any critical nets can be evaluated. If any of the critical nets have high positive slack, the routing parameters may be relaxed and the potentially scanty wire resources can be reassigned to other critical nets. The routing may then continue with updated routing parameters.

In the embodiment depicted in FIG. 1, the first logic template that matches the logic structure of the circuit is used to direct the routing process and any required placement. In another embodiment, all logic templates that match the structure are compared against specific design criteria for the circuit (or a specified design scenario) to determine the logic template that is the best match.

FIG. 2A is a text diagram depicting one example of a logic template 200 in accordance with at least one embodiment of the present invention. As depicted, the logic template 200 includes one or more topology formulas 210 that may be associated with one or more scenarios 220. The depicted logic template 200 also includes a wiring formula 230. The logic template 200, or the like, can be used to determine which routing recipe to use when routing logic cells or other logic structures within an integrated circuit.

The depicted logic template 200 includes a topology formula 210A corresponding to a low power scenario 220A and a topology formula 210B corresponding to a high throughput scenario 220B. In the depicted topology formulas 210 (i.e., 210A and 210B), the logical function of various stages of a logic network are specified with a function identifier 212 that indicates the type of logic cell used within each stage of the logic network. For example, the depicted topology formulas 210 specify four stages of cells that are symbolically appended to the logic network via the plus operator (+). Cells may have coarse granularity such as ALU slices or fine granularity such as inverters (e.g., INV) and 2 input logic gates (e.g., NAND2, and NOR2).

The depicted topology formulas 210 also include a cell count formula 214 that is passed as a parameter to the function identifier 212 and indicates the number of cells that are allocated to a stage. In the depicted topology formulas 210, the cell count formula 214 (i.e., the number of logic cells assigned to each stage) is dependent on a datawidth indicator 216.

The depicted logic template 200 also includes a wiring formula 230 that indicates how specific stages of the logic network are interconnected to a subsequent stage. In the depicted embodiment, the wiring formula 230 indicates how the outputs of stage 2 are connected to the inputs of stage 3. In another embodiment, a CAD engine (not shown) specifies interconnections between stages via common node names. In some embodiments, critical nets within a logic structure are identified by the logic template 200. For example, in one embodiment specific cells or outputs that are considered critical are enumerated in a critical list (not shown). In some embodiments, critical nets are identified by parameters that include systemic patterns such as relative bit order significance, stage sequence count, fan-out, and the like.

FIG. 2B is a text diagram depicting one example of a routing recipe 250 in accordance with at least one embodiment of the present invention. As depicted, the routing recipe 250 includes a set of wiring parameters 260A corresponding to a 'Low Power' scenario and a set of wiring parameters 260B corresponding to a 'High Throughput' scenario. In the depicted example, the wiring parameters 260 (i.e., 260A and 260B) include a slack range 262, a width code 264, and a spacing code 266. The wiring parameters 260 enable scenario dependent specification of wiring parameters. For example, a topology formula may be associated with a particular scenario. In response to finding logical structures within an integrated circuit design that match the topology formula, a routing recipe corresponding to the particular scenario and topology formula may be used to route the logical structures.

Figure 3:
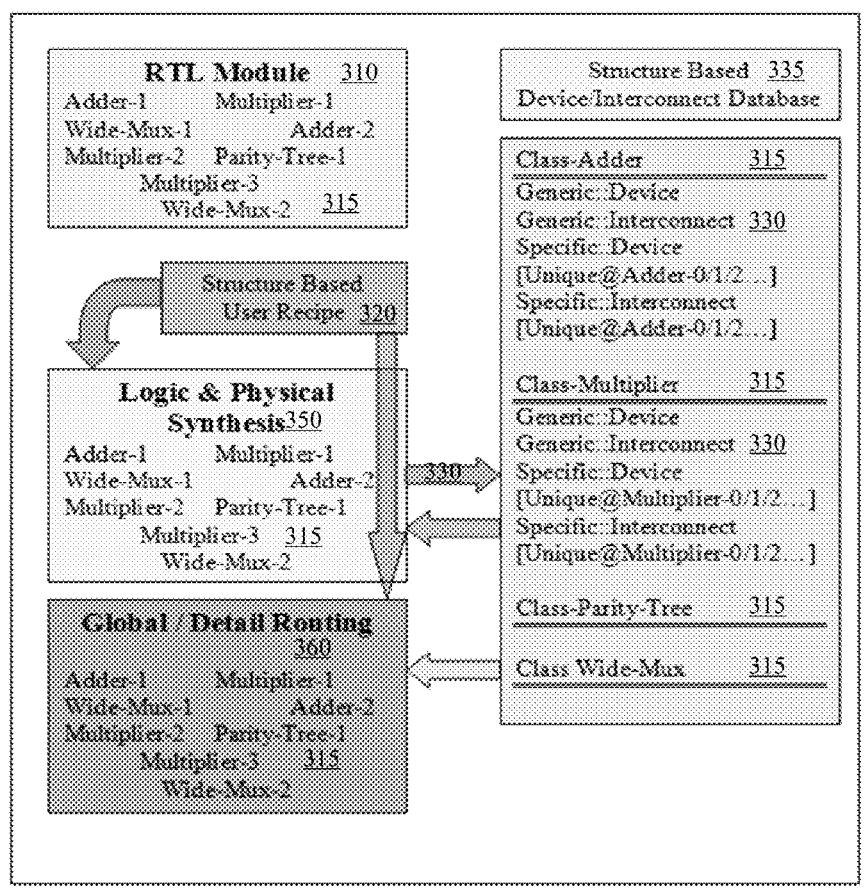
FIG. 3 is a block diagram depicting one example of using the present invention within a circuit design environment.

FIG. 3 is a block diagram depicting one example 300 of using the present invention within a circuit design environment. A circuit design may be specified using various hardware description statements 310. The hardware description statements 310 may be high-level statements that define logic structures 315. The hardware description statements 310 may be further defined via sub-statements (not shown).

A routing recipe 320 may be extracted from a database (not shown) based on a routing scenario (not shown) associated with the logic structures 315. The routing scenario may influence specific circuit metrics such as circuit speed, power consumption, and circuit density. Examples of scenarios include "low latency", "high latency", "low throughput", "high throughput", "low power", "high power", "low density", "high density", and the like. The routing recipe 320 may define various recipe parameters 330. Examples of recipe parameters 330 that may be defined in routing recipes include wire-code (e.g., a combination of metal stack, width and spacing), wire layer, target scenic ratio, routing priority, routing weight, scenic ratio, wirecode assignment, layer assignment, and a pre-route sequence. The recipe parameters 330 may be assigned to specific structures (or classes) 315 within an interconnection database 335 that is used to guide logical and physical synthesis 350 and routing 360 of the structures 315.

Figure 4A:
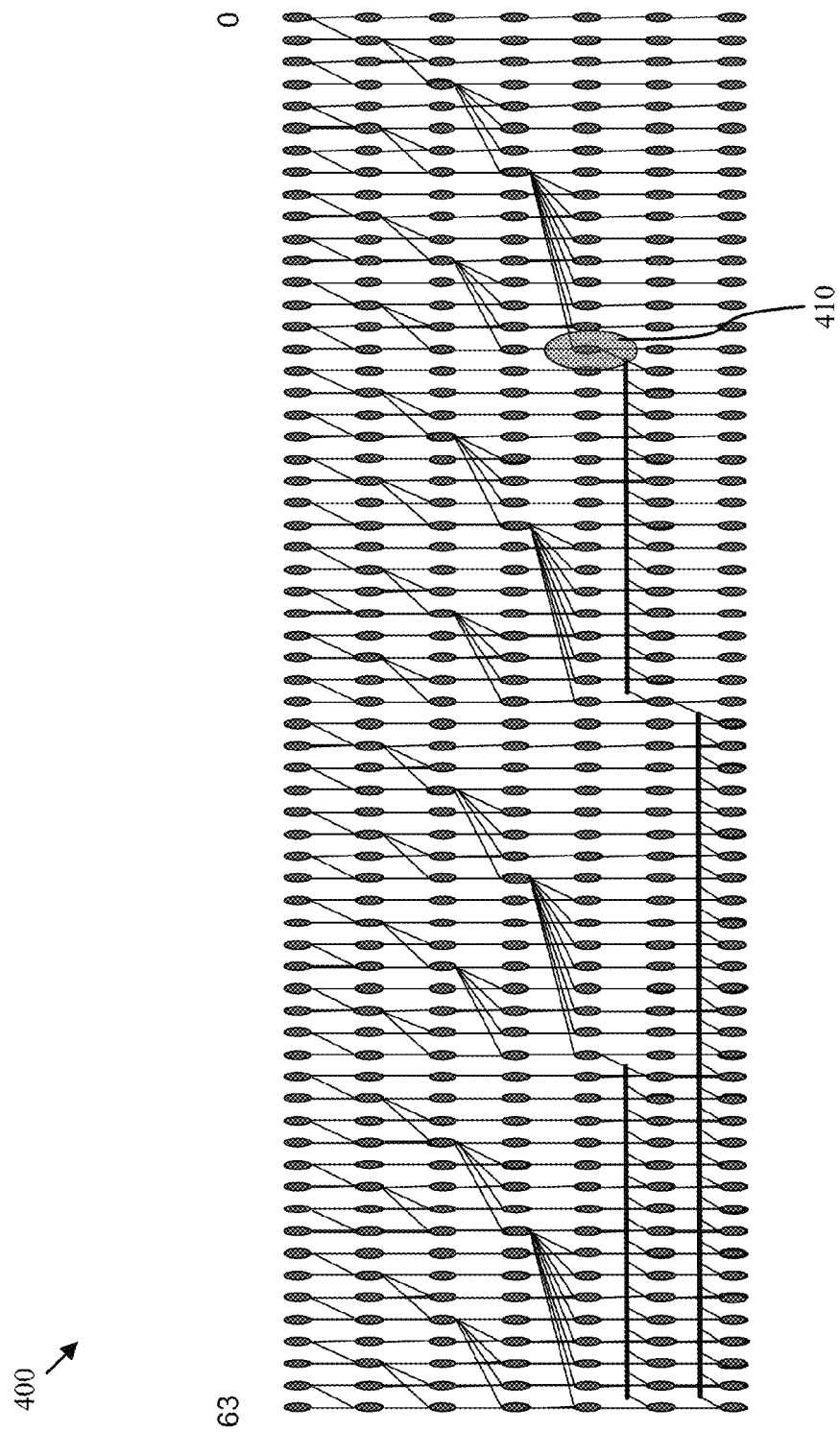
FIGS. 4A and 4B are schematic diagrams depicting one example of the effect of scenario dependent routing recipes on logic synthesis, placement, and routing.
Figure 4B:
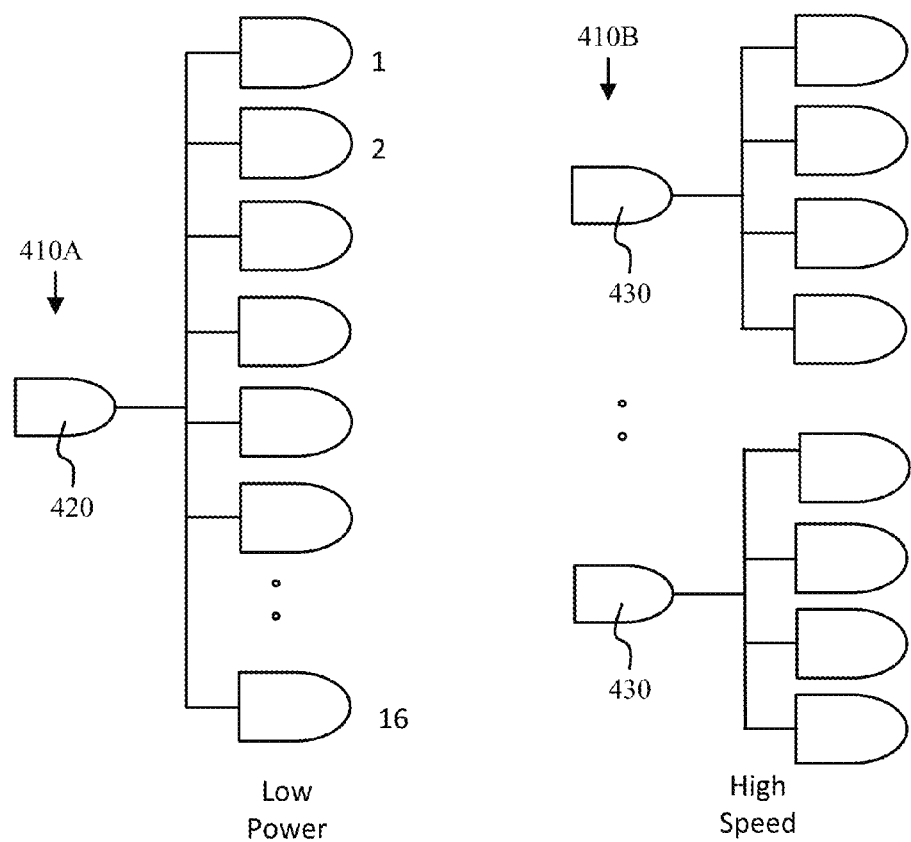

FIGS. 4A and 4B are schematic diagrams depicting one example of the effect of scenario dependent routing recipes on logic synthesis, placement, and routing. FIG. 4A depicts an adder structure 400 that is known in the art as a Sklansky adder. One feature of the adder structure 400 is that the fanout for carry propagation doubles at each stage. For example, a selected cell 410 depicted in FIG. 4A has a fanout of 16.

A topology formula (not shown) corresponding to the Sklansky adder may be used to detect the presence of the adder structure 400 within a circuit design. Various routing scenario may be specified for the adder structure that changes the logic synthesis, placement, and routing of the adder structure. For example, as shown in as shown in FIG. 4B, a "Low Power" scenario may result in the selected cell 410 being implemented as a cell 410A having single driver 420 that drives all 16 of the cells for the next stage. In contrast, a "High Speed" scenario may result in a cell 410B having multiple drivers 430 that each drive 4 cells in the next stage. Furthermore, various routing parameters such as the wire code assignments, wire spacing, and wiring layer may be different for each scenario in order to achieve the objectives of each scenario.

The embodiments disclosed herein recognize that in many circuit design environments, complex logic structures can benefit from specific synthesis, placement and routing solutions that are tailor-made for that structure type (e.g., arithmetic logic structures such as adders and multipliers). By leveraging one or more embodiments disclosed herein, structure specific routing solutions can be implemented using sequences such as the following sequence: (1) Building a database or library to store structure (or class) specific design recipes under a set of design scenarios or contexts. (2) Defining a near-optimal set of recommended routing recipes (i.e., ground rules) for various structures including scenario specific recipes. (3) Using a "context mapper" that performs cost-function or metric based evaluation of design contexts (e.g., via topology formulas) and assigns routing recipes (and optionally placement recipes) to specific logic structure elements. (4) Using a placement and routing engine that is guided by the assigned placement and routing recipes and attempts to honor them to best possible extent.

Figure 5:
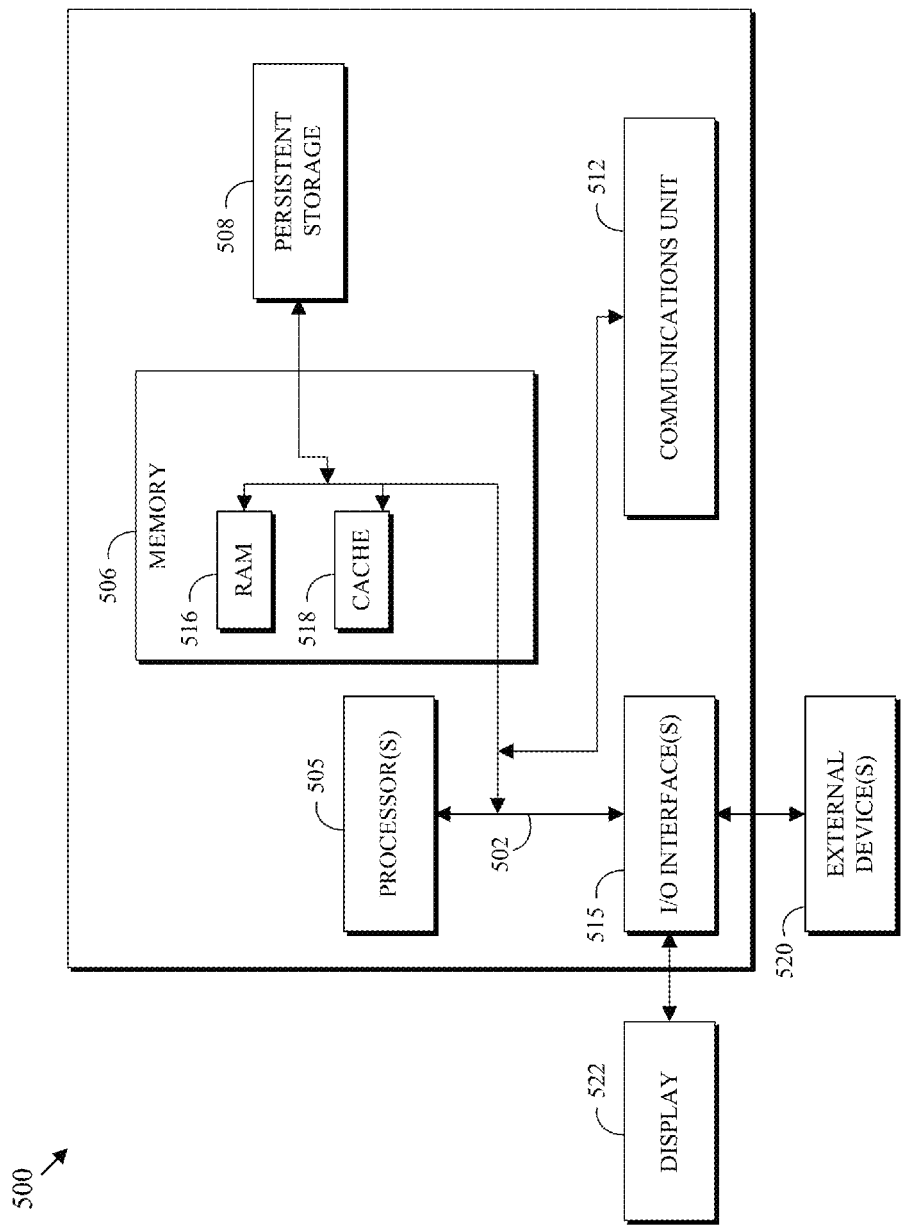
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
   one or more processors;
   one or more computer readable storage media and program instructions stored on the one or more computer readable storage media, the program instructions comprising instructions to execute a method comprising:
   receiving a logic structure for a circuit;
   retrieving a logic template, the logic template comprising a wiring formula that defines an interconnection pattern for interconnecting a plurality of cell stages;
   the logic template further comprising a topology formula that is datawidth dependent and defines a cell type and a cell quantity for at least one stage of the plurality of cell stages;
   determining whether the logic structure for the circuit matches the logic template;
   routing the circuit using a routing recipe corresponding to the logic template in response to determining that the logic structure matches the logic template;
   wherein the routing recipe is dependent on a datawidth of the circuit and at least one circuit metric selected from the group consisting of circuit speed, circuit power consumption, and circuit density; and
   wherein the routing recipe comprises parameters useful for guiding a routing process including two or more of a routing priority, a routing weight, a scenic ratio, a wirecode assignment, and a layer assignment.

* * * * *